United States Patent [19]

Kline

[11] 4,097,464
[45] Jun. 27, 1978

[54] 2,6-DI-TERT-ALKYL-4-VINYLPHENOLS AS POLYMERIZABLE ANTIOXIDANTS

[75] Inventor: Richard H. Kline, Cuyahoga Falls, Ohio

[73] Assignee: The Goodyear Tire & Rubber Company, Akron, Ohio

[21] Appl. No.: 628,685

[22] Filed: Nov. 3, 1975

[51] Int. Cl.² .................. C08F 236/06; C08F 36/06; C08F 216/02
[52] U.S. Cl. .............................. 260/62; 260/45.95 H; 260/47 UA
[58] Field of Search ............ 260/47 UA, 62, 45.95 H

[56] References Cited

U.S. PATENT DOCUMENTS

| | | | |
|---|---|---|---|
| 2,647,883 | 8/1953 | Evans et al. | 260/47 UA |
| 3,457,328 | 7/1969 | Blatz et al. | 260/47 UA |
| 3,645,970 | 2/1972 | Kleiner | 260/47 UA |
| 3,767,628 | 10/1973 | Kline | 260/47 UA |
| 3,953,402 | 4/1976 | Kline | 260/47 UA |
| 3,953,411 | 4/1976 | Kline | 260/47 UA |
| 3,957,920 | 5/1976 | Kliner et al. | 260/47 UA |
| 3,962,187 | 6/1976 | Kline | 260/47 UA |
| 3,993,714 | 11/1976 | Kanagawa et al. | 260/880 R |

FOREIGN PATENT DOCUMENTS 4,941,116  11/1974  Japan.

*Primary Examiner*—Herbert J. Lilling
*Attorney, Agent, or Firm*—J. A. Rozmajzl; D. B. Little

[57] ABSTRACT

2,6-Di tert alkyl-4-vinylphenols are copolymerized in free radical emulsion polymerization systems to form self-stabilizing polymers. Such polymers have the advantage that the antioxidant cannot be extracted or volatilized from the polymer.

6 Claims, No Drawings

2,6-DI-TERT-ALKYL-4-VINYLPHENOLS AS POLYMERIZABLE ANTIOXIDANTS

This invention relates to polymerizable, i.e., monomeric antioxidants which can be copolymerized in free-radical emulsion polymerization systems to form self-stabilizing polymers. More particularly this invention relates to diene polymers having antioxidants chemically a part thereof, said antioxidants being incapable of being volatilized or extracted therefrom.

Essentially all types of rubber, both natural and synthetic, and particularly rubbers formed from dienes, are known to be susceptible to deterioration resulting from prolonged exposure to oxidative aging. A great deal of effort has been expended by those engaged in the field of polymer technology to develop various stabilizers that will effectively inhibit the adverse effects of aging of polymeric compositions. Unfortunately, many of the commercially accepted stabilizers may be volatilized when the polymeric products are exposed to elevated temperatures and/or high vacuum over prolonged periods of time. Furthermore, they are rather quickly extracted from polymeric compositions by repeated washings with aqueous detergent solutions or organic solvents. These severe conditions are routinely encountered by garments containing rubber when they are subjected to frequent laundering or dry-cleaning.

It is therefore an object of this invention to provide polymeric compositions that are resistant to oxidative aging. It is another object of this invention to provide a process of preparing age resistant polymeric compositions. A further object of this invention is to provide polymeric compositions that are highly resistant to oxidative aging at elevated temperatures even after repeated exposure to aqueous detergent solutions or dry-cleaning fluids. It is a still further object of this invention to provide polymers possessing antioxidants chemically bound thereto. Other objects will become apparent as the description proceeds.

In accordance with the present invention self-stabilizing polymeric compositions are prepared by polymerizing a phenolic antioxidant with one or more comonomers. The phenolic antioxidant which can be so used has the following structural formula:

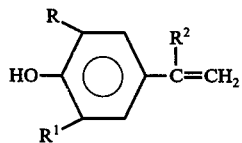

wherein R and $R^1$ are tertiary alkyl radicals containing from 4 to 8 carbon atoms and $R^2$ is selected from the group consisting of hydrogen and methyl. Preferably $R^2$ is hydrogen.

Compounds illustrating the practice of the present invention include the following.

2,6-di tert.butyl-4-vinylphenol
2,6-bis(1,1-dimethylbutyl)-4-vinylphenol
2,6-di tert.butyl-4-(α-methylvinyl)phenol
2,6-bis(1,1-dimethylpropyl)-4-vinylphenol
2,6-bis)1,1-dimethylpentyl)-4-(α-methylvinyl)phenol
2,6-bis(1,1,3,3-tetramethylbutyl)-4-vinylphenol
2,6-bis(1,1,2-trimethylpropyl)-4-vinylphenol The compounds of the present invention can be prepared by the following general method. A solution of a 2,6-di tert.alkyl-4-(α-hydroxyethyl)phenol in hexane is stirred vigorously with a 5 to 10 fold excess of concentrated hydrochloric acid for 30 minutes to 1 hour at room temperature. The layers are separated and the hexane layer is evaporated. The crude 2,6-di tert.alkyl-4-(α-chloroethyl) phenol thus obtained is dissolved in pyridine and the solution is heated at reflux for 30 minutes to 1 hour. The 2,6-di tert.butyl-4-vinylphenol is isolated by distillation of the pyridine, preferably under reduced pressure.

The following examples illustrate the preparation of the compounds of the present invention. They are not intended to limit the method by which the compounds are prepared since the method by which they are prepared is not critical.

EXAMPLE 1

2,6-di tert.butyl-4-vinylphenol

A solution of 50 grams of 2,6-di tert.butyl-4-(α-hydroxyethyl)phenol in 100 milliliters of hexane was stirred vigorously with 100 milliliters of concentrated HCl for 1 hour. The hexane layer was separated and the hexane removed by distillation under aspirator vacuum. The residual 2,6-di tert.butyl-4-(α-chloroethyl)phenol was dissolved in 100 milliliters of pyridine and the solution was heated under reflux for 30 minutes. Pyridine was removed by distillation under aspirator vacuum and the residue, after washing with water, was crystallized from acetone at −78° C. There was obtained 44 grams of product with a melting point of 36°-39° C.

EXAMPLE 2

2,6-bis(1,1-dimethylbutyl)-4-vinylphenol

A solution of 91.8 grams of 2,6-bis(1,1-dimethylbutyl)-4-(α-hydroxyethyl)phenol in 400 milliliters of hexane was stirred vigorously with 400 milliliters of concentrated HCl for 1 hour. The hexane layer was separated and the hexane was removed by distillation under aspirator vacuum. The residual 2,6-bis(1,1-dimethylbutyl)-4-(α-chloroethyl) phenol was dissolved in 150 milliliters of pyridine and the solution was heated under reflux for 1 hour. Pyridine was removed by distillation under aspirator vacuum. The residue was washed with water, then dried in a vacuum oven. The product, a viscous yellow liquid, weighed 26 grams.

The self-stabilizing polymers of the present invention can be prepared by well known free radical emulsion polymerization techniques. In this respect Applicant incorporates by reference the disclosure of U.S. Pat No. 3,714,122 at column 4, lines 12 to 68; column 5, lines 1 to 68 and column 6, lines 1 to 45.

The monomeric charge contains at least 40 parts by weight of diene monomer and from 0.1 to 10 parts by weight of the 2,6-di tert.alkyl-4-vinylphenol, all being parts by weight per 100 parts by weight of total monomer in the charge. In addition to the diene and phenolic monomers, other monomers may be used in combination therewith. Examples of monomers which may be used with the phenolic monomers are those recited at column 6 of the aforementioned patent, lines 6 to 59.

The polymers resulting from the free radical emulsion polymerization of the monomeric systems described herein contain at least 0.10 to 10 parts by weight per 100 parts by weight of total polymer of at least one segmeric unit having the following structure

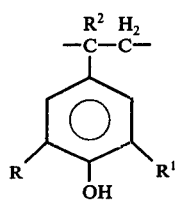

wherein R, $R^1$ and $R^2$ are as earlier defined.

The polymers also contain at least 40 parts by weight of bound diene monomer (i.e., the segmeric form of the diene monomer).

Oxidation resistant elastomers of this invention were prepared using the following recipes.

| Ingredients | Parts by Weight | |
|---|---|---|
| | SBR | NBR |
| Butadiene | 77.5 | 67 |
| Styrene | 22.5 | — |
| Acrylonitrile | — | 33 |
| Water | 180 | 180 |
| Potassium soap of tallow fatty acids | 5.0 | 5.0 |
| Tert.dodecyl mercaptan | 0.6 | 0.6 |
| Azoisobutyronitrile | 0.6 | 0.5 |
| Antioxidant | Variable | 1.5 |

The SBR polymerizations were run for 17 hours at 50° C. followed by 4 hours at 65° C. The NBR polymerizations were run for 21.5 hours at 50° C. followed by 4 hours at 65° C. The resulting latices were coagulated by pouring into isopropyl alcohol.

Test Data:

The polymers prepared in the preceding examples were extracted for 48 hours with methanol in a Soxhlet extractor and the extracted polymers were dissolved in benzene. Films were cast from the benzene solutions and oxygen absorption measurements were made on the films. The data are as follows.

| Antioxidant | Polymer | Amount Charged | Hours to Absorb 1% $O_2$ at 100° C. |
|---|---|---|---|
| 2,6-di tert.butyl-4-vinylphenol | NBR | 1.5 pts. | 88 |
| " | SBR | 0.8 | 288 |
| " | SBR | 1.5 | 323 |
| " | SBR | 1.9 | 309 |
| 2,6-bis(1,1-dimethylbutyl)-4-vinylphenol | NBR | 1.5 | 23 |
| " | SBR | 1.5 | 173 |
| 2,6-di tert.butyl-4-(α-methylvinyl)phenol | NBR | 1.5 | 96 |
| " | SBR | 1.5 | 258 |

As indicated by the above data, the polymers, after extraction, possessed resistance to oxidative degradation. It should be noted that the SBR polymers were particularly benefited by the practice of the present invention.

While certain representative embodiments and details have been shown for the purpose of illustrating the invention, it will be apparent to those skilled in this art that various changes and modifications may be made therein without departing from the spirit or scope of the invention.

1 claim:

1. A process of preparing a self-stabilizing diene polymer comprising polymerizing in a free radical emulsion polymerization system a monomer system comprised of at least 40 parts by weight of diene monomer and 0.10 to 10 parts by weight of at least one phenolic monomer having the following structural formula

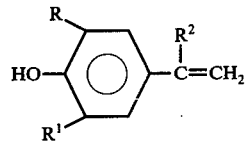

wherein R and $R^1$ are tertiary alkyl radicals containing from 4 to 8 carbon atoms and $R^2$ is selected from the group consisting of hydrogen and methyl and wherein all parts are parts by weight per 100 parts of total monomer.

2. The process according to claim 1 wherein the phenolic monomer is 2,6-di tert.butyl-4-vinylphenol.

3. The process of claim 1 wherein the monomer system is comprised of 1,3-butadiene, the phenolic monomer and another monomer selected from the group consisting of styrene and acrylonitrile.

4. The process according to claim 3 wherein the other monomer is styrene.

5. A self-stabilizing diene polymer of which the molecular structure includes at least 40 parts by weight of a conjugated diene monomer and 0.10 to 10 parts by weight of at least one phenolic segmeric unit having the following structural formula

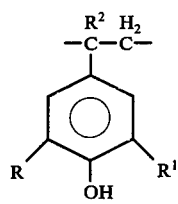

wherein R and $R^1$ are tertiary alkyl radicals containing from 4 to 8 carbon atoms and $R^2$ is selected from the group consisting of hydrogen and methyl and wherein all parts are parts by weight per 100 parts by weight of total polymer.

6. The polymer according to claim 5 which is comprised of at least 40 weight percent 1,3-butadiene, a monomer selected from the group consisting of styrene and acrylonitrile, and 0.10 to 10 parts by weight of at least one phenolic segmeric unit having the following structural formula

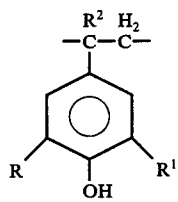

* * * * *

UNITED STATES PATENT AND TRADEMARK OFFICE
CERTIFICATE OF CORRECTION

PATENT NO. : 4,097,464
DATED : June 27, 1978
INVENTOR(S) : Richard H. Kline

It is certified that error appears in the above-identified patent and that said Letters Patent are hereby corrected as shown below:

In Column 2, Line 63, "Lines 6 to 59" should be corrected to read "Lines 46 to 59".

Signed and Sealed this

Nineteenth Day of June 1979

[SEAL]

Attest:

RUTH C. MASON
Attesting Officer

DONALD W. BANNER
Commissioner of Patents and Trademarks